E. O. LAUGEN & S. S. VATHING.
CORN PLANTER ATTACHMENT.
APPLICATION FILED MAR. 24, 1916.
1,215,943.
Patented Feb. 13, 1917.
2 SHEETS—SHEET 1.
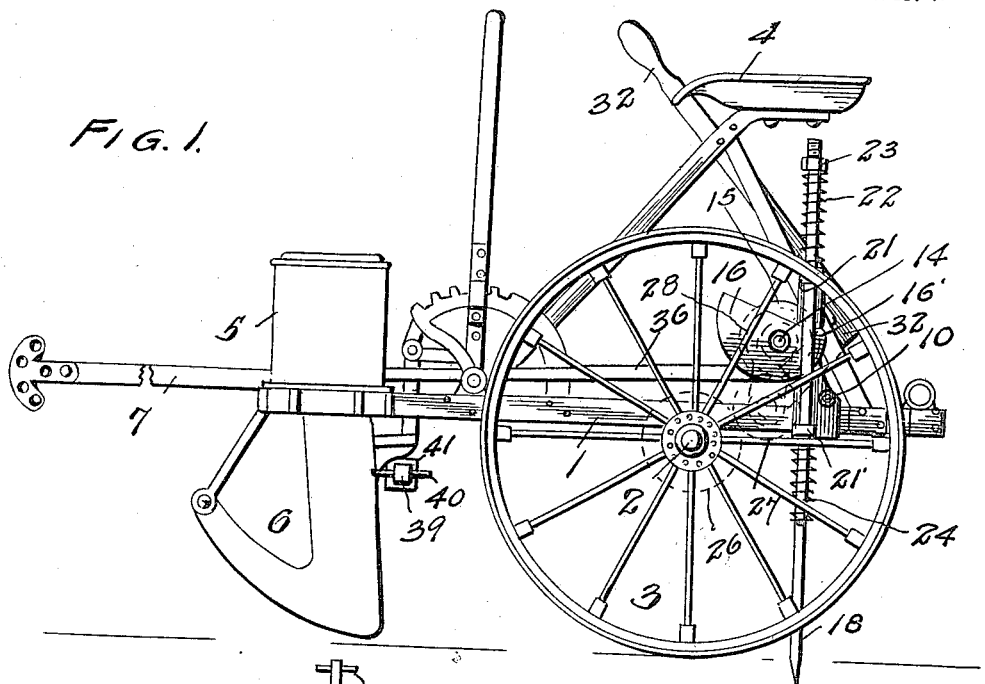
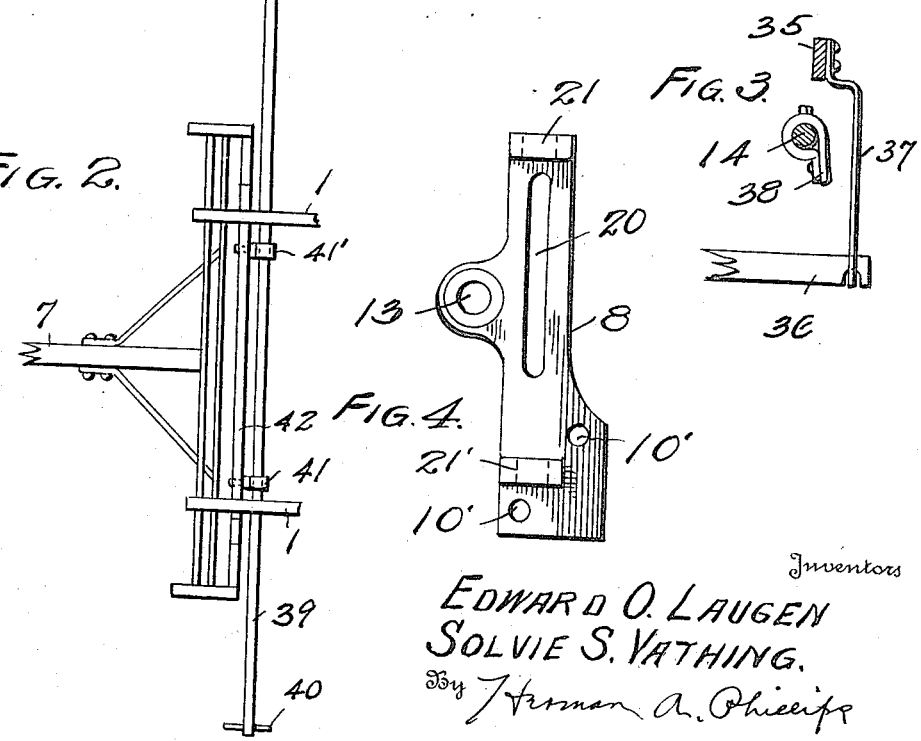
Inventors
EDWARD O. LAUGEN
SOLVIE S. VATHING.
By Herman A. Phillips
Attorney

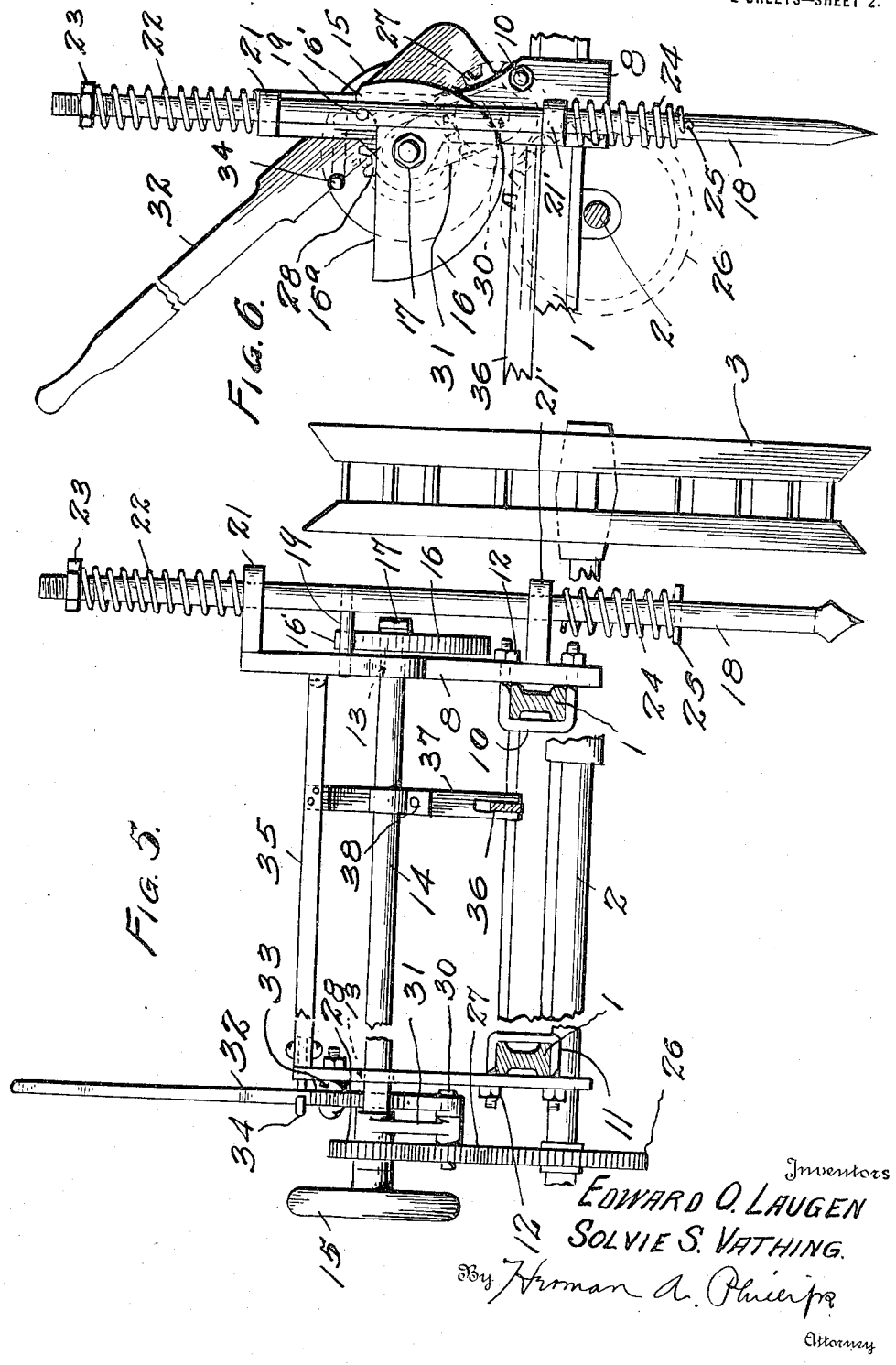

UNITED STATES PATENT OFFICE.

EDWARD O. LAUGEN AND SOLVIE S. VATHING, OF HOUSTON, MINNESOTA.

CORN-PLANTER ATTACHMENT.

1,215,943. Specification of Letters Patent. Patented Feb. 13, 1917.

Application filed March 24, 1916. Serial No. 86,488.

*To all whom it may concern:*

Be it known that we, EDWARD O. LAUGEN and SOLVIE S. VATHING, citizens of the United States of America, residing at Houston, in the county of Houston and State of Minnesota, have invented new and useful Improvements in Corn-Planter Attachments, of which the following is a specification.
Our invention relates to improvements in corn planter attachments, and is designed particularly for use in connection with wireless corn planters.

The primary object of our invention is the provision of a marker to be used in connection with the corn planter of the riding type by means of which the field may be marked for planting with facility and despatch. There are certain objectionable features and difficulties that are hard to overcome in using the wire or check row planters, such as the necessity of the operator descending from the planter at each end of the field in order to reset the anchor stakes, and adjust the wire, and in other ways adjust the planter for marking, while with our device the operator is not required to leave his seat on the planter, it being only necessary to throw out of operation the attachment and adjust the parts while remaining in the seat of the planter.

The invention consists in certain novel combinations and arrangements of parts as will hereinafter be pointed out and claimed.
In the accompanying drawings we have illustrated one complete example of the physical embodiment of our invention constructed according to the best mode we have so far devised for the practical application of the principles of the invention.

Figure 1 is a side elevation of so much of a corn planter as is necessary to illustrate the adaptation thereto of our invention.

Fig. 2 is a top plan view of the front portion of the planter showing connected thereto a slidable guide arm used in connection with the marker.

Fig. 3 is an enlarged sectional detail view of the hill tripper connected with the corn feeding device, and which operates in conjunction with our marker attachment.

Fig. 4 is an elevation view of one of the brackets used to attach our device to the corn planter.

Fig. 5 is a view in elevation, showing the corn planter frame in section, and illustrating our attachment applied to the frame.

Fig. 6 is a view of the attachment as seen from the right in Fig. 5.

Our marker attachment may be used in connection with any of the standard corn planters, and in the drawings we have illustrated a well known type of planter, comprising the U-shaped frame 1, the driving axle or shaft 2 which is journaled in the frame and has the traction wheels 3, as usual. The seat 4 is provided for the driver, and is supported in usual manner, while the seed receptacle 5, feeding shoe 6, and tongue 7 are of usual construction.

Our attachment may be used in connection with existing planters, or it may be built in as a part of new planters. When attached to the usual planter, we employ the two brackets 8 and 9, which are attached to the frame 1, by means of U-bolts or yokes 10 and 11, and these bolts are secured to the frame by means of the nuts 12, perforations 10' being provided in the brackets to accommodate the U-bolts. The brackets are located to the rear of the main axle 2, and project vertically above the frame a suitable distance. Each bracket is provided with an opening 13 to accommodate the cam shaft 14 which operates the marker attachment. At one end, this cam shaft is provided with a hand wheel 15, and the other end of the shaft which is reduced and projects through the bracket 8, has seated thereon the cam disk 16 which is secured in place by means of the threaded nut 17. This disk 16 is designed to revolve with the shaft 14, and to impart a reciprocating motion to the vertically arranged plunger 18 which is provided with a horizontally extending pin 19 which is to be acted upon by the cam disk 16, and which is designed to travel, vertically, in the slot 20 of the bracket 8. The plunger is guided in its movement in the two perforated flanges 21, 21' of the bracket 8, and the pin 19 in its travel in the slot 20 prevents rotation of the plunger 18. In normal position, the plunger is held uplifted from the ground by means of the coil spring 22 which encircles the upper end of the plunger, and is located between the flange 21 and an adjusting nut 23 secured on to the upper threaded end of the plunger 18. A similar spring 24 is located about the plunger beneath the flange 21′, and this spring is designed to act as a means for forcing the plunger into the ground. A pin 25 passed through a perforation in the plunger bar or marker 18, confines this spring between the perforated flange 21′ and this pin.

The plunger bar is reciprocated from the driving axle or shaft 2, and the rotary motion of the shaft which is afterward converted to the reciprocating motion by means of the cam disk 16, is provided through the medium of the large gear wheel 26 on shaft 2, the idle pinion 27, and pinion 28 which is fixed on shaft 14. The idle pinion 27 is journaled at 30 on a link 31 which is loose on the shaft 14, and the idle pinion is moved to operative, or inoperative position by means of the operating lever 32 which is pivoted on the bracket 9 at 33. The operating lever is designed to swing the idle pinion 27 out of engagement with the gear 26 and pinion 28, and in this manner the marker device is disconnected and inoperative. When it is desired to operate the marker, the lever 32 is thrown over to the right as in Fig. 6, and a hook 34 which is pivoted on a cross arm 35 attached to the two brackets, is swung around and engaged in a notch on the lever, and in this manner the idle pinion 27 is swung to position and held there in order to transmit motion from the gear wheel 26 to the pinion 28 and thus revolve the shaft 14 and with it the cam disk 16.

In connection with the marking device we also operate the seed feeding device or hill tripper arm 36 which is hooked to a resilient strap 37 which is attached to the cross arm 35. This resilient strap and the trip arm 36 are operated by the detent or trip 38 on the shaft 14, and the rotary motion of the trip 38 when it contacts with the strap 37 reciprocates the arm 36 and operates the feeder, as will be readily understood.

In connection with the marker we employ a guide bar 39, preferably of wood and rectangular in cross section, which is equipped at each end with a sight pin 40, and the bar is slidably supported in a pair of brackets 41 and 41′ attached to one of the angle irons 42 of the forward frame members of the corn planter.

The operation of the attachment will be apparent from an inspection of the drawings, and it will be evident that as the cam disk 16 is revolved anti-clockwise in Fig. 6, the disk will raise the plunger through the co-action of the pin 19, until the plane edge 16ᵃ of the disk swings around and contacts with the pin 19. At this point the pin is freed, and the plunger is forced down by the compression spring 24, and the pointed end of the plunger makes the desired mark in the ground. An abrupt shoulder 16′ is provided at the end of the plane edge 16ᵃ, so that by contacting with the pin 19, the plunger is immediately withdrawn from the ground a sufficient distance to clear the surface of the ground, and not drag thereon. The continued revolution of the cam disk 16 now lifts the plunger to its uppermost position, and it is then ready for a second marking of the ground, and the operation is repeated as the work progresses.

When equipping a corn planter with our device, in order to adjust the marking device, the cam disk is left loose upon the shaft 14, and the planter is preferably raised from the ground by the usual lifting device. By means of the hand wheel 15, the shaft 14 is turned until the trip 38 operates the hill trip arm 36. The implement is then pulled ahead until the plunger 18 is in line with the hill dropped, and then the disk 16 may be set in proper position and fastened securely on the shaft 14 by means of the nut 17. The train of gears 26, 27, 28 is so arranged that the cam disk will make a single revolution as the implement travels forward, say, forty-two inches. This distance, of course, may be varied, or other adjustments may be used if desired to suit circumstances. When the implement has arrived at the end of a row, the guide 39, which for convenience is shown in inoperative position in Fig. 2, is pushed out to one side of the implement until the pin 40 is in line with the row last marked, and then the hand wheel may be resorted to, if necessary, to adjust the next row of marks. In this manner the guide bar 39, or rather one of the pins 40 in the end of the bar travels over the preceding line of marks and the line of marks being made may be gaged in this manner.

What we claim is:

1. The combination with a slotted bracket provided with perforated flanges, of a reciprocable bar supported in said flanges, a compressible spring between a fixed part of the bar and one of the flanges, a cam shaft and a disk thereon having a cam face and a plane edge, a guide pin on the bar projecting in the slotted bracket and operatively engaging the cam disk, and means for rotating the cam shaft whereby the reciprocable member is depressed by the compressible spring when the pin is freed from the cam face.

2. The combination in a planter, of a marking device comprising a vertically reciprocable plunger bar, a cam shaft supported on the planter and means for revolving the same, a disk on the shaft having a cam face and a plane edge, means operatively connecting said disk and plunger for lifting the plunger, a shoulder on the disk located between the plane edge and the cam face to impart an initial lift to the plunger, and means for projecting the plunger when freed from the cam face of the disk.

In testimony whereof we affix our signatures.

EDWARD O. LAUGEN.
SOLVIE S. VATHING.

Copies of this patent may be obtained for five cents each, by addressing the "Commissioner of Patents, Washington, D. C."